United States Patent
Shi et al.

(10) Patent No.: US 8,072,894 B2
(45) Date of Patent: Dec. 6, 2011

(54) SYSTEMS AND METHODS FOR FLOW MONITORING

(75) Inventors: Fuguang Shi, Saratoga, CA (US); Jack Kohn, Mountain View, CA (US); David Rowell, Mountain View, CA (US); Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 138 days.

(21) Appl. No.: 11/936,319

(22) Filed: Nov. 7, 2007

(65) Prior Publication Data

US 2009/0116398 A1    May 7, 2009

(51) Int. Cl.
*G01R 31/08*    (2006.01)

(52) U.S. Cl. ....................................... 370/252

(58) Field of Classification Search .................. 370/392, 370/203, 229–235, 252–259, 351–360, 395.1–395.5, 370/419–429, 466–468; 709/224
See application file for complete search history.

(56) References Cited

U.S. PATENT DOCUMENTS

| | | | | |
|---|---|---|---|---|
| 5,790,522 A * | 8/1998 | Fichou et al. | ................. | 370/236 |
| 5,790,799 A * | 8/1998 | Mogul | ........................... | 709/224 |
| 6,473,400 B1 * | 10/2002 | Manning | ...................... | 370/229 |
| 6,901,052 B2 * | 5/2005 | Buskirk et al. | ................ | 370/235 |
| 7,050,435 B1 * | 5/2006 | Walker et al. | ................. | 370/392 |
| 7,193,968 B1 * | 3/2007 | Kapoor et al. | ................ | 370/235 |
| 7,213,264 B2 * | 5/2007 | Poletto et al. | .................... | 726/22 |
| 7,215,637 B1 * | 5/2007 | Ferguson et al. | .......... | 370/230.1 |
| 7,411,910 B1 * | 8/2008 | Frink et al. | ..................... | 370/235 |
| 2003/0145231 A1 | 7/2003 | Poletto et al. | | |
| 2005/0013300 A1 * | 1/2005 | Akahane et al. | ........... | 370/395.3 |
| 2005/0210533 A1 * | 9/2005 | Copeland et al. | ............... | 726/23 |
| 2005/0270984 A1 * | 12/2005 | Kodialam et al. | .......... | 370/252 |
| 2005/0276230 A1 * | 12/2005 | Akahane et al. | ............. | 370/252 |
| 2007/0019548 A1 * | 1/2007 | Krishnamurthy | ............. | 370/232 |
| 2007/0027984 A1 * | 2/2007 | Jorgensen et al. | ........... | 709/224 |
| 2007/0041331 A1 | 2/2007 | Ma et al. | | |
| 2007/0076606 A1 * | 4/2007 | Olesinski et al. | ............. | 370/230 |
| 2007/0160073 A1 * | 7/2007 | Toumura et al. | .............. | 370/419 |
| 2007/0271374 A1 * | 11/2007 | Shomura et al. | .............. | 709/224 |
| 2008/0212586 A1 * | 9/2008 | Wang et al. | .................... | 370/392 |

OTHER PUBLICATIONS

Claise, Cisco System Netflow Services Export Version 9, IETF RFC 3954, Oct. 2004.*

(Continued)

*Primary Examiner* — Kwang B Yao
*Assistant Examiner* — Jung-Jen Liu
(74) *Attorney, Agent, or Firm* — Harrity & Harrity, LLP (57) ABSTRACT

A network device may include logic configured to receive a packet from a packet forwarding engine, create a flow ID for the packet, determine whether the flow ID matches one of a plurality of flow IDs in a table, determine whether the packet is associated with a flow to be sampled, sample the packet and additional packets associated with the flow that are received from the packet forwarding engine when the flow is to be sampled and transmit the flow ID and the sampled packets via a switch to an interface.

24 Claims, 8 Drawing Sheets

OTHER PUBLICATIONS

Partial European Search Report corresponding to EP 08 25 3615, dated Apr. 28, 2009, 5 pages.

European Search Report corresponding to EP 08 25 3615 dated Jun. 19, 2009, 12 pages.

N. Duffield, "A Framework for Packet Selection and Reporting", AT&T Labs—Research, XP015051577, Jun. 2007, pp. 1-33.

B. Claise et al., "Cisco Systems NetFlow Services Export Version 9", Cisco Systems, XP015009726, Oct. 2004, pp. 1-33.

J. Quittek et al., "Information Model for IP Flow Information Export", Internet Engineering Task Force, XP015049414, Feb. 2007, pp. 1-167.

* cited by examiner

| FLOW ID 510 | SOURCE IP ADDRESS 520 | DESTINATION IP ADDRESS 530 | SOURCE PORT 540 | DESTINATION PORT 550 | PROTOCOL 560 | PACKET/ BYTE COUNT 570 | SAMPLE 580 |
|---|---|---|---|---|---|---|---|
| • • • | • • • | | | | | | |

| FLOW ID 515 | SOURCE MAC ADDRESS 525 | DESTINATION MAC ADDRESS 535 | VLAN 545 | ETHERNET TYPE 555 | PACKET/ BYTE COUNT 565 | SAMPLE 575 |
|---|---|---|---|---|---|---|
| • • • | • • • | | | | | |

SYSTEMS AND METHODS FOR FLOW MONITORING

BACKGROUND INFORMATION

Network devices, such as switches or routers, may be used not only to route and/or switch data packets to their destinations, but may also be used to collect information related to the data packets and network traffic. Existing network devices that collect flow statistics and/or sample data packets are not able to correlate flow statistics with sampled data packets as these functions are performed by different components at different points within the network device.

SUMMARY

According to one aspect, a network device may be provided. The network device may include a number of interfaces connected via an interconnect. Each interface may include a packet forwarding engine (PFE), a switch, and logic configured to receive a packet from the PFE. The logic may be further configured to create a flow ID for the packet, determine whether the flow ID matches one of a number of flow IDs in a table, determine whether the packet is associated with a flow to be sampled, sample the packet and additional packets associated with the flow that are received from the PFE, when the flow is to be sampled, and transmit the flow ID and the sampled packets via the switch to another interface.

According to another aspect, a method may be provided. The method may include creating a flow ID for each packet received from a packet forwarding engine (PFE), updating a table of flow IDs with the created flow IDs for each of the received packets, determining from the table if packets associated with a flow ID are to be sampled, sampling packets associated with the flow ID when it is determined that packets associated with the flow ID are to be sampled and sending the sampled packets to an interface via an Ethernet switch.

According to another aspect, a network device may be provided. The network device may include means for receiving packets, means for creating flow IDs based on the received packets, means for storing a table of the created flow IDs, means for determining from the table of created flow IDs whether to sample the received packets, means for sampling the received packets when it is determined to sample the received packets, means for determining from the table of created flow IDs when to transmit one of the created flow IDs and means for transmitting the sampled received packets and the determined flow IDs to a switch.

BRIEF DESCRIPTION OF THE DRAWINGS

The accompanying drawings, which are incorporated in and constitute a part of this specification, illustrate embodiments described herein and, together with the description, explain the embodiments. In the drawings.

DETAILED DESCRIPTION

The following detailed description refers to the accompanying drawings. The same reference numbers in different drawings may identify the same or similar elements. In addition, while some of the following description is provided mainly in the context of routers or other network elements at layer 2 and/or layer 3 and/or layer 4 of the Open Systems Interconnection (OSI) Model, the description provided herein may be applied to different types of network devices at different layers of communication (e.g., a Multi-protocol label switching (MPLS) routers, a Synchronous Optical Network (SONET) add-drop multiplexers, a Gigabit Passive Optical network (GPONs) switches, a Synchronous Digital Hierarchy (SDH) network elements, etc.).

In the following, a system may create and update a flow table of statistics based on received packets. The system may also sample received packets. In addition, the system may transmit the information stored in the flow table to an external device for processing and/or analysis. The embodiments described herein may also apply to non-packet data (e.g., cells).

Figure 1:
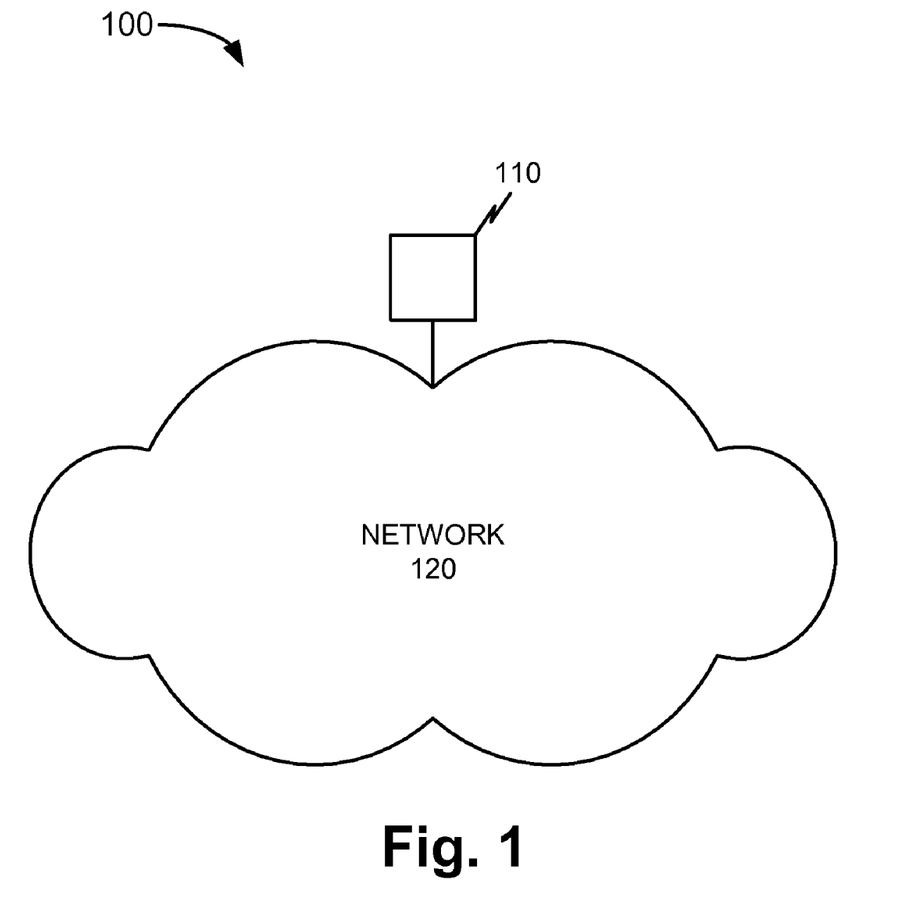
FIG. 1 shows a network in which concepts described herein may be implemented.

FIG. 1 shows an exemplary network in which concepts described herein may be implemented. As shown, network 100 may include network element 110 and a network 120. In practice, network 100 may include additional elements than those illustrated in FIG. 1. Network element 110 may include a device for performing network-related functions, such as a router or a switch (e.g., a provider edge (PE) router in a MPLS network). Network 120 may include the Internet, an ad hoc network, a local area network (LAN), a wide area network (WAN), a metropolitan area network (MAN), a cellular network, a public switched telephone network (PSTN), any other network, or a combination of networks. Network element 110 may communicate with other network elements (not shown) in network 120 through a wired or wireless communication link.

Figure 2:
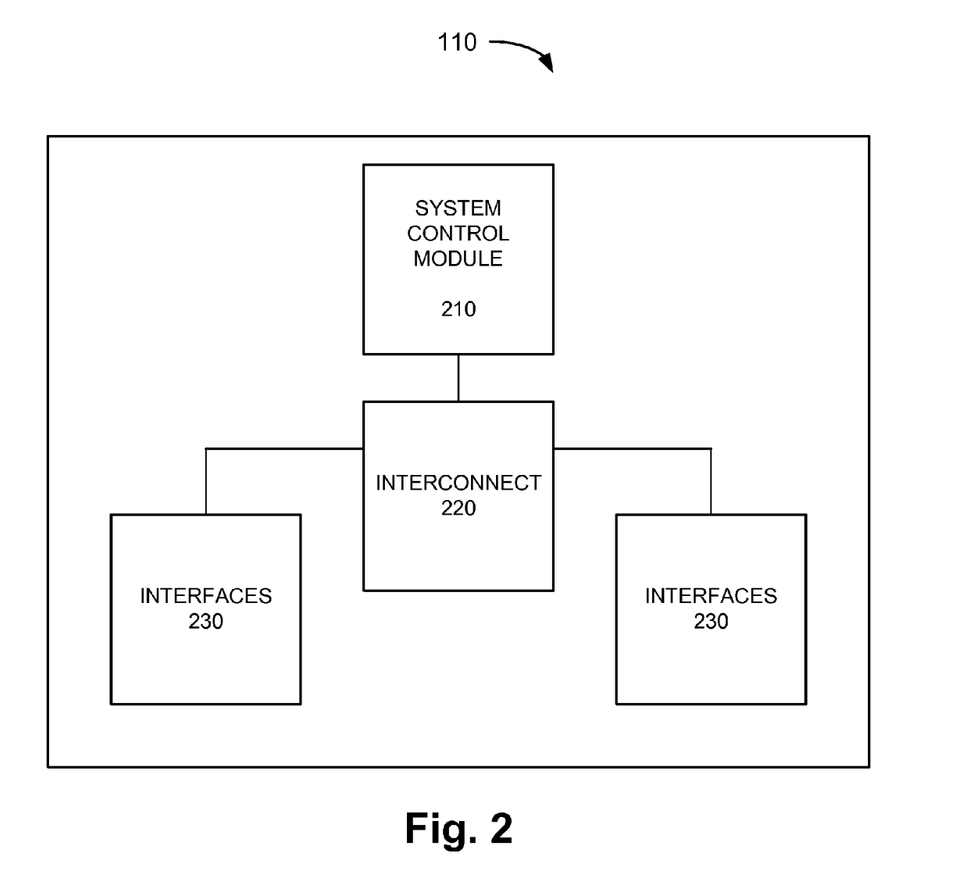
FIG. 2 is a block diagram of an exemplary device of FIG. 1.

FIG. 2 shows an exemplary block diagram of network element 110. As shown, network element 110 may include a system control module 210, interconnect 220 and interfaces 230. In other implementations, network element 110 may include fewer, additional, or different components than those illustrated in FIG. 2.

System control module 210 may include one or more processors, microprocessors, application specific integrated circuits (ASICs), field programming gate arrays (FPGAs), and/or processing logic that may be optimized for networking and communications. System control module 210 may perform high level management functions for network element 110. For example, system control module 210 may communicate with other networks and systems connected to network element 110 to exchange information regarding network topology. System control module 210 may create routing tables based on network topology information and create forwarding tables based on the routing tables and may send these tables to interfaces 230 for data packet routing. System control module 210 may also include a static memory (e.g. a read only memory (ROM)), a dynamic memory (e.g. a random access memory (RAM)), and/or onboard cache, for storing data and machine-readable instructions. System control module 210 may also include storage devices, such as a floppy disk, a CD ROM, a CD read/write (R/W) disc, and/or flash memory, as well as other types of storage devices.

Interconnect 220 may include one or more switches or switch fabrics for directing incoming network traffic, such as data packets, from one or more of interfaces 230 to others of interfaces 230. Interconnect 220 may also include processors, memories, and/or paths that permit communication among system control module 210 and interfaces 230.

Interfaces 230 may include devices or assemblies, such as line cards, for receiving incoming data packets from network links and for transmitting data packets to network links. In other examples, interfaces 230 may include Ethernet cards, optical carrier (OC) interfaces and asynchronous transfer mode (ATM) interfaces.

Depending on implementation, the components that are shown in FIG. 2 may provide fewer or additional functionalities. For example, if network element 110 performs an Internet Protocol (IP) packet routing function as part of a Multi-Protocol Label Switching (MPLS) router, system control module 210 may perform tasks associated with obtaining routing information from other routers in a MPLS network. In such cases, conveying network traffic from one interface to another may involve label based routing, rather than IP address based routing.

Figure 3:
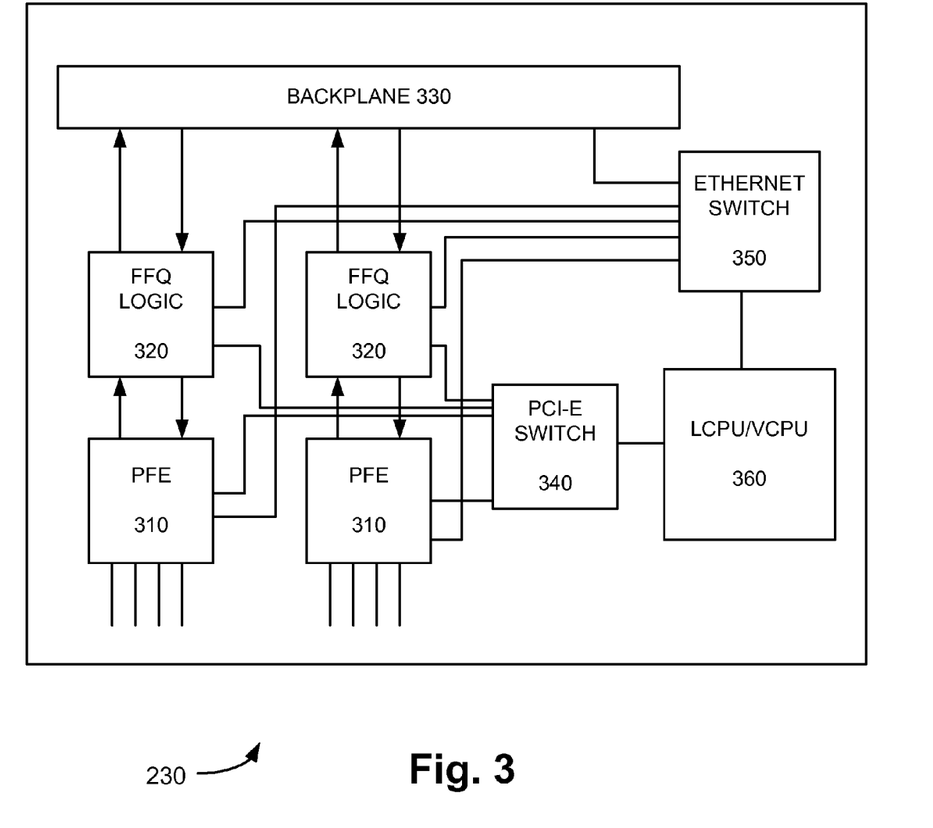
FIG. 3 is a functional block diagram of the exemplary device of FIG. 1.

FIG. 3 is a block diagram of an interface 230 as shown in FIG. 2. As shown, interface 230 may include packet forwarding engines 310, flow management and fabric queuing logic 320, backplane 330, Peripheral Component Interconnect Express (PCI-E) switch 340, Ethernet switch 350 and Local Central Processing Unit/Visibility Central Processing Unit (LCPU/VCPU) 360. In different implementations, interface 230 may include fewer, additional, or different components than those illustrated in FIG. 3.

Packet forwarding engine (PFE) 310 may include hardware and/or software for receiving, storing, processing and/or forwarding data packets. For example, PFE 310 may process packets received from an incoming link and prepare packets for transmission on an outgoing link. PFE 310 may also perform route lookup based on packet header information to determine destination information for the packets. PFE 310 may also include memories for storing received packets. PFE 310 may also transmit received data packets to flow management and fabric queuing logic (FFQ) 320 and may transmit/receive information and/or packets to/from PCI-E switch 340 and Ethernet switch 350.

Flow management and fabric queuing logic (FFQ) 320 may include hardware and/or software for receiving data packets from PFE 310 and monitoring and/or sampling the flow of data packets. For example, FFQ 320 may receive a data packet, create a table entry (i.e. flow ID) for the flow and monitor flow statistics. For example, FFQ 320 may use a set of counters for each flow to track packet/byte counts for a flow of data packets. FFQ 320 may also sample packets and may send sampled packets and other information, such as flow table records, to PCI-E switch 340 and/or Ethernet switch 350. FFQ 320 may also transmit data packets from PFE 310 to backplane 330.

Backplane 330 may include a switching fabric and/or memories for transmitting data packets to/from interconnect 220 (as shown in FIG. 2).

Peripheral Component Interconnect Express (PCI-E) switch 340 may include a high speed switching interface for transmitting/receiving data packets and information between PFE 310, FFQ 320 and/or LCPU/VCPU 360.

Ethernet switch 350 may include an Ethernet switch that may transmit data packets and/or information among PFE 310, FFQ 320 and/or LCPU/VCPU 360. Ethernet switch 350 may also transmit and/or receive data packets and/or information over an out-of-band plane, via backplane 330 to another device (internal or external to network element 110) for further processing and/or analysis.

Local Central Processing Unit/Visibility Central Processing Unit (LCPU/VCPU) 360 may include one or more processors, microprocessors, application specific integrated circuits (ASICs), field programming gate arrays (FPGAs), and/or processing logic for performing network communications, management and analysis functions. For example, LCPU/VCPU 360 may control functions related to (local) operations between components shown in FIG. 3 and may control functions related to "visibility" of data packets transmitted though interface 230 (as shown in FIG. 3). For example, LCPU/VCPU 360 may include hardware and/or software for managing a flow table of records and sampling data packets. For example, LCPU/VCPU 360 may receive a flow table record and sampled packets from FFQ 320. LCPU/VCPU 360 may also transmit flow table records and sampled data packets to an external device via Ethernet switch 350.

For example, in managing flow records, LCPU/VCPU 360 may receive flow table records and statistics from FFQ 320, aggregate and/or maintain the received flow table records and statistics in a shadow table, and export the aggregated flow table records and/or statistics to another device within network element 110, or alternatively, to a network device that is external to network element 110. LCPU/VCPU 360 may aggregate flow table records and/or statistics based on various parameters, such as a communication protocol, a port number, source and/or destination addresses, a source/destination address prefix, a source/destination autonomous system (AS) prefix, etc.

Figure 4:
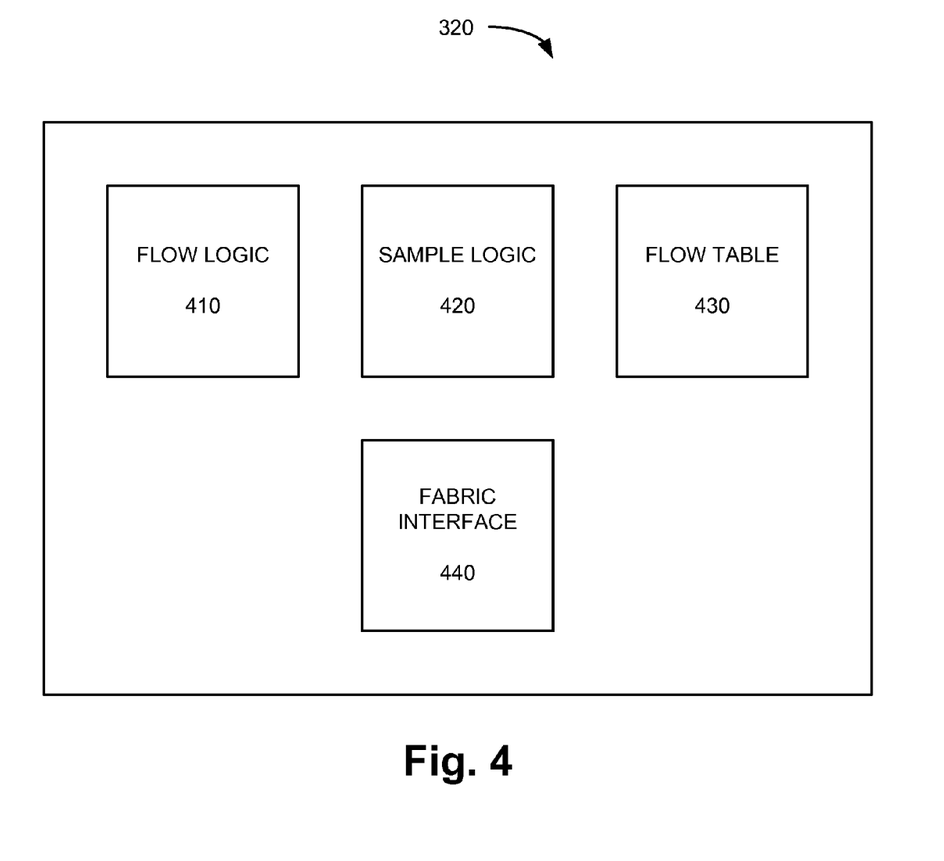
FIG. 4 is a functional block diagram of exemplary flow management and fabric queuing logic of FIG. 3.

FIG. 4 shows a functional block diagram of exemplary FFQ 320. As shown, FFQ 320 may include flow logic 410, sample logic 420, flow table 430 and fabric interface 440. In different implementations, FFQ 320 may include fewer, additional, or different components than those illustrated in FIG. 4.

Figure 5A:
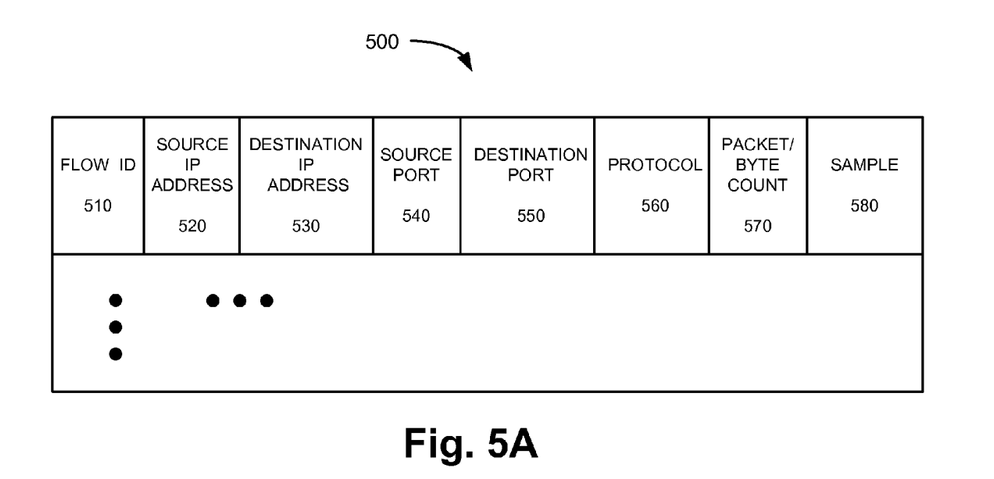
FIGS. 5A and 5B illustrate exemplary flow tables of FIG. 4.
Figure 5B:
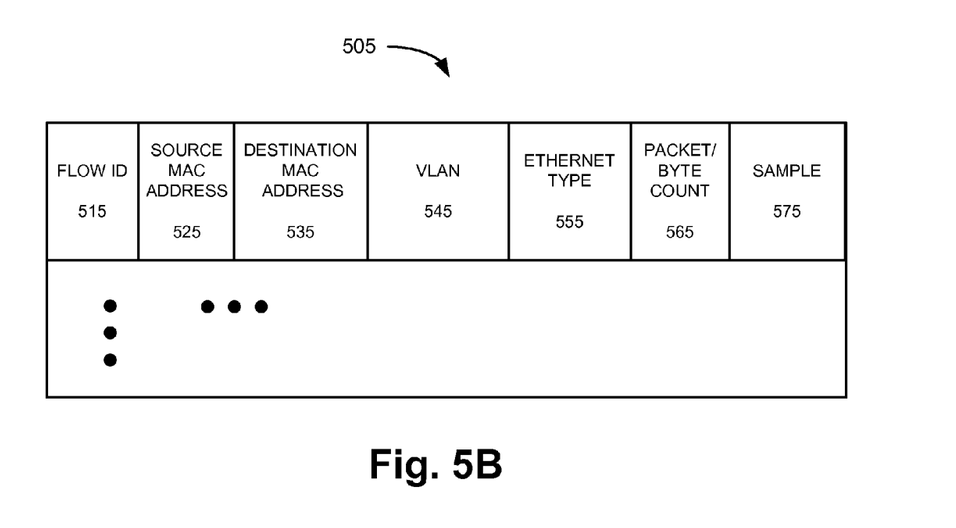

Flow logic 410 may include hardware and/or software for receiving a data packet, creating a flow ID from the header of the received packet and updating flow table 430. For example, flow logic may create a flow ID for each received data packet, where the flow ID may be created from a five-tuple in the packet header. For example, numerical values in the packet header that relate to the source address, the destination address, the source port, the destination port and/or the protocol (as shown in FIGS. 5A and 5B) may be added or combined in some manner to form a flow ID. Flow logic 410 may also determine if a created flow ID exists in flow table 430. Flow logic 410 may also include logic to monitor or track statistics related to a flow. For example, flow logic 410 may include packet/byte counters that may track flow statistics. Flow logic 410 may include one or more interfacing buffers or queues (not shown) for temporarily storing received data packets.

Sample logic 420 may include hardware and/or software that may sample received data packets. For example, sample logic 420 may sample or copy received data packets. For example, a received data packet may be copied and sent to Ethernet switch 350, while simultaneously transmitting the received data packet to backplane 330. Alternatively, a received data packet may be copied and sent to a control module 210 or another dedicated processing unit across the backplane 330 while simultaneously transmitting the received data packet to an egress port on another interface module 220 across the backplane 330. Sample logic 420 may also manage the sampled data packets. For example, depending on control settings and/or information stored in flow table 430, sample logic 420 may determine when to sample a flow of data packets. For example, in one setting, if a flow is determined to be new (e.g., not already present in flow table 430) the first N data packets in the flow may be sampled. In another example, if information stored in flow table 430 indicates sampling, the data packets may be continuously sampled. In other examples, all data packets with a specific network address prefix (e.g., 191.178.2.0) may be sampled. In another setting, data packets may be sampled randomly. In yet another setting, data packets may be sampled by comparing a hash value of a data packet header to a particular or selected value. Combined operation of the flow table 430, sample logic 420 and flow logic 410 makes it possible to sample contiguous sets of packets form a given flow.

Flow table 430 may include a number of records of flow statistics. For example, each record may include a flow ID and associated fields of information. Flow table 430 may include up to four million flow entries/records, for example. An exemplary record in flow table 430 is shown and described below with reference to FIGS. 5A and 5B.

Fabric interface 440 may include hardware and/or software for providing an interface between PFE 310 and backplane 330. Fabric interface 440 may include one or more interfacing buffers or queues (not shown) for temporarily storing incoming data packets and interfacing with backplane 330.

FIG. 5A is a diagram of one type of exemplary flow table 500. As shown, flow table 500 may include a number of flow table records. Each flow table record may include a flow ID field 510 and associated fields, including one or more of fields 520-580 as described below.

Flow ID field 510 may contain information for identifying a flow and/or for indicating a location of the flow record within flow table 500. As described above, for example, flow ID 510 may be created using a five-tuple (e.g., the values in fields 520-560) extracted from a received packet header.

Source IP address field 520 may contain information for indicating a source IP address from which the flow of data packets originates.

Destination IP address field 530 may contain information for indicating a destination IP address for the flow of data packets.

Source port field 540 may contain information for identifying an input port included in interface 230, for example.

Destination port field 550 may contain information for indicating source and destination ports (e.g., port 83 for web server) for the flow of data packets.

Protocol field 560 may contain information for indicating a communication protocol (e.g., Transport Control Protocol (TCP)) used for the data packets in the flow.

Packet/byte count field 570 may contain information for accumulating and/or indicating the number of packets and/or bytes that have been transferred by the flow.

Sample field 580 may contain information for indicating if data packets pertaining to the flow are to be sampled.

FIG. 5B is a diagram of another exemplary flow table 505. As shown, flow table 505 may include a number of entries/records of flow information and statistics relating to a flow. Each record may include fields 515-575 as described below.

Flow ID field 515 may contain information for identifying and/or indicating a location of the flow record within flow table 505.

Source MAC address field 525 may contain information identifying the MAC address from which a flow of data packets originates.

Destination MAC address field 535 may contain information for indicating a destination MAC address for the flow of data packets.

VLAN field 545 may contain information identifying a virtual local area network from which the data packets originate.

Ethernet type field 555 may contain information for indicating the type of Ethernet format/frame and/or protocol for the flow of data packets.

Packet/byte count field 565 may contain information for accumulating and indicating the number of data packets and/or bytes that may have been transferred by the flow.

Sample field 575 may contain information for indicating if data packets pertaining to the flow are to be sampled.

During maintenance of flow table 500/505, a time stamp may be used to indicate when the record (within flow table 500 or 505) was last updated. When a record has not been updated for longer than a particular amount of time (e.g. one hour), the age of the record may be determined as "old." Records that are determined to be "old" may be removed from flow table 500/505 and sent to another device (internal or external to network element 110) as described with reference to FIG. 8, for example.

Figure 6:
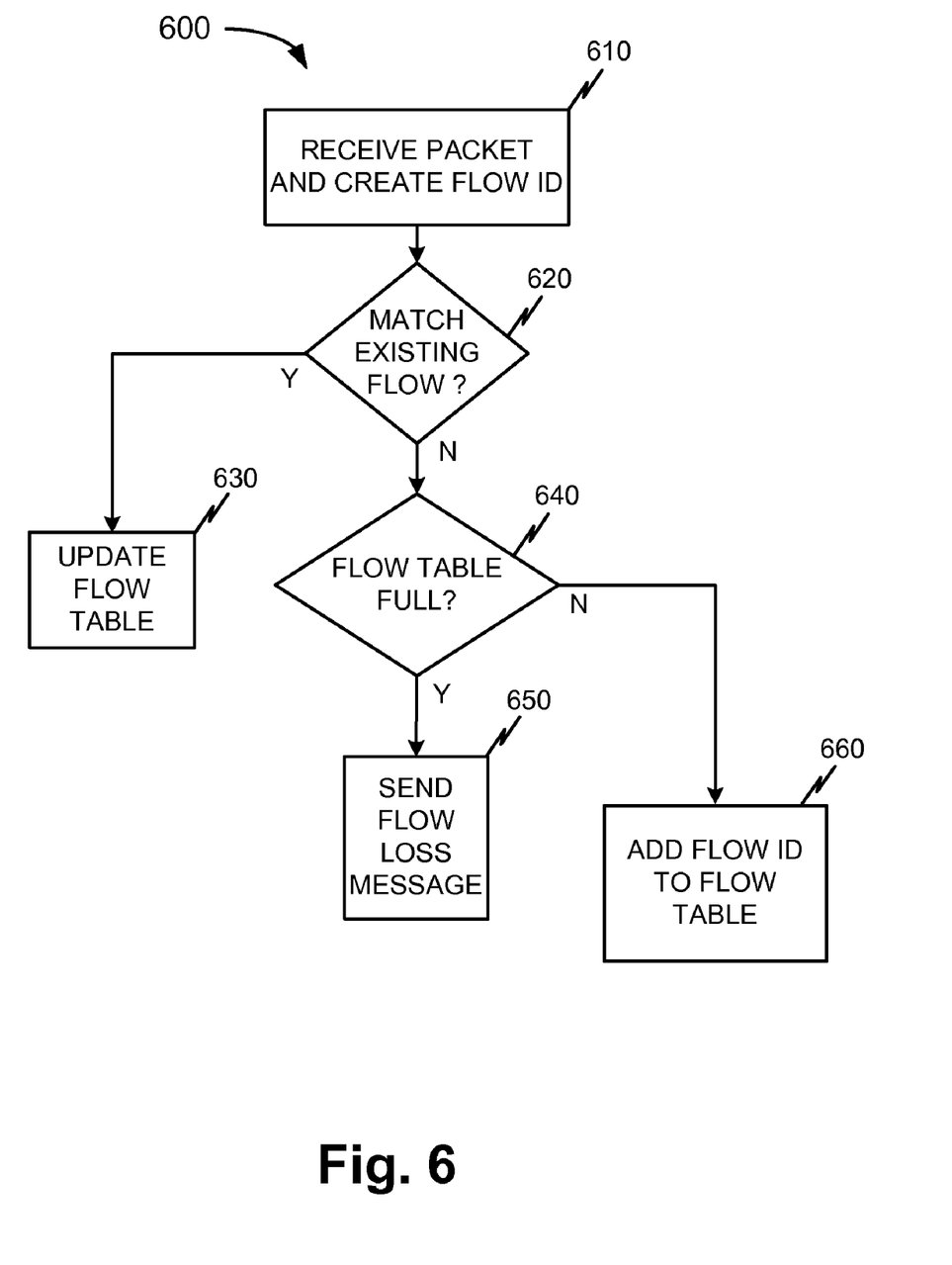
FIG. 6 is a flowchart of an exemplary process for monitoring flows.

FIG. 6 shows an exemplary flow monitoring process 600. Process 600 may begin when a packet is received and a flow ID is created (block 610). For example, a packet may be received from PFE 310 in FFQ 320, where flow logic 410 may then create a flow ID. Flow logic 410 may use a five-tuple received in the packet header to form the flow ID, for example. FFQ 320 may then check flow table 430 for a match of an existing flow ID (block 620). If, for example, a flow ID of the received packet matches a flow ID in flow table 430, an existing flow match may be determined (Yes in block 620). If an existing flow match has been determined, statistics from the flow may be updated (block 630). For example, flow logic 410 may count the number of packets/bytes in the flow and may update the packet/byte count field 570 (as shown in FIG. 5) accordingly.

If, for example, a flow ID of the received packet does not match a flow ID in flow table 430, (No in block 620), process 600 may continue by determining if the flow table is full (block 640). For example, if flow table 430 is full (Yes in block 640) a flow loss message may be sent from FFQ 320 to LCPU/VCPU 360 indicating that flow table 430 is full and new flow entries may not be added (block 650). If, for example, flow table 430 is not full (No in block 640), the created flow ID (and associated fields 520-580/515-575, as shown in FIGS. 5A and/or 5B) may be added to flow table 430 (block 660). In this manner, flows of data packets may be identified, stored and monitored by FFQ 320. When a new flow is created in the flow table 430, a flow creation message is sent from FFQ 320 to the Ethernet switch 350. The flow creation message may contain the header of the packet that resulted in the flow creation, as well as other relevant information such as the time of creation (timestamp) of the flow, corresponding flow ID in the flow table 430, first N bytes of the payload of the packet, etc. Flow creation messages can be directed to LCPU/VCPU 360 or to another target across the backplane 330. For example, flow creation messages can be used to maintain a shadow flow table at the LCPU/VCPU 360 or another dedicated central processor module located across the backplane. Shadow flow tables may be used to keep track of statistics for all the flows in an interface module 230 that may include multiple instances of FFQ 320 devices, for example.

Figure 7:
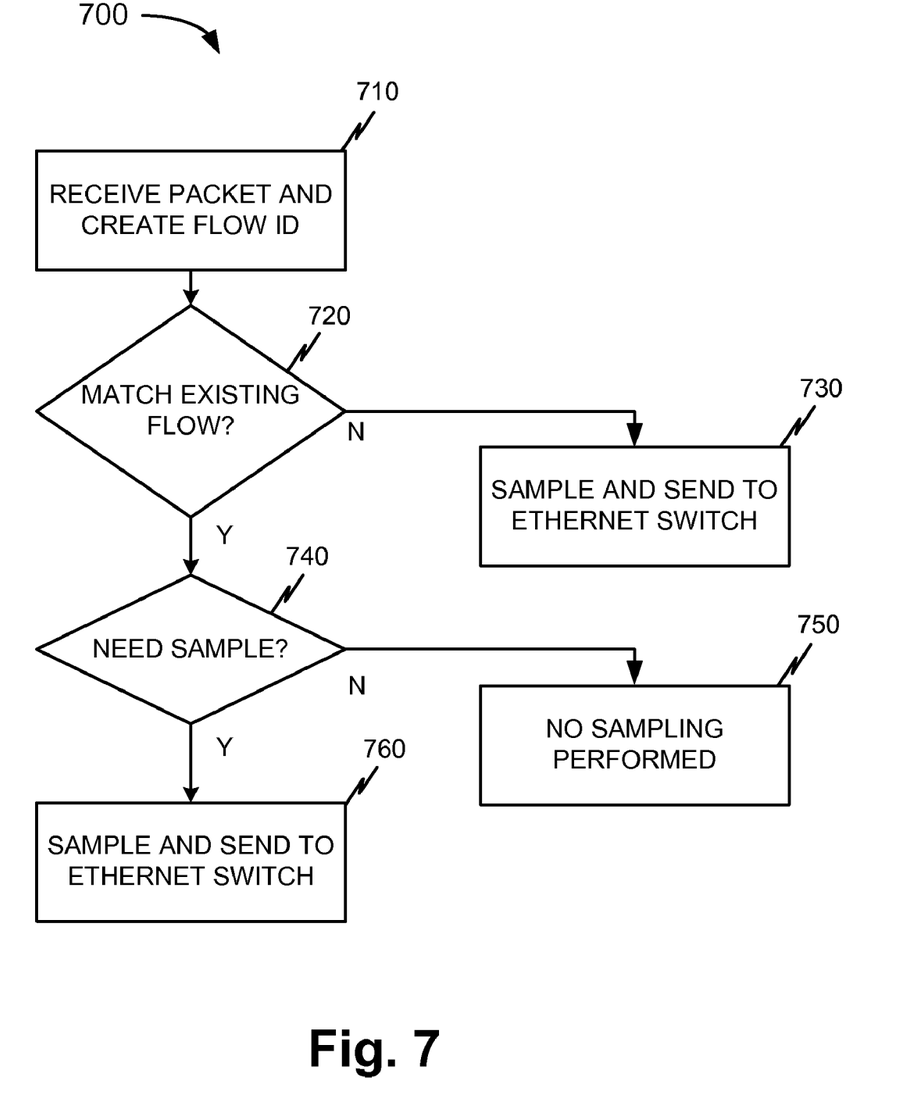
FIG. 7 is a flowchart of an exemplary process for sampling flows.

FIG. 7 shows an exemplary flow sampling process 700. Process 700 may begin when a packet is received and a flow ID is created (block 710). For example, a packet may be received from PFE 310 in FFQ 320, where flow logic 410 may then create a flow ID. As described above, a flow ID may be created by flow logic 410 using a received five-tuple in the packet header. FFQ 320 may then check flow table 430 for a match of an existing flow (block 720). If, for example, a flow ID of the received packet does not match a flow ID in flow table 430, (No in block 720) this may indicate a new flow. As described above for example, FFQ 320 may be programmed to sample (using sample logic 420) the first N packets of new flows by sampling the received packets and sending copies to Ethernet switch 350 (block 730).

If, for example, a flow ID of the received packet matches a flow ID in flow table 430, an existing flow match may be determined (Yes in block 720). If an existing flow match has been determined, FFQ 320 may access flow table 430 to determine whether to sample the flow (as indicated by the value in sample field 580) (block 740). If, for example, a flow sample is needed (Yes in block 740), process 700 may continue by sampling the data packets in the flow and sending copies to Ethernet switch 350 (block 760). For example, sample logic 420 may sample data packets by switching the sampled packets to Ethernet switch 350 for transmission to another device (internal or external to network element 110). If, for example, a flow sample is not needed (No in block 740), process 700 may continue without sampling the data packets in the flow (block 750).

Figure 8:
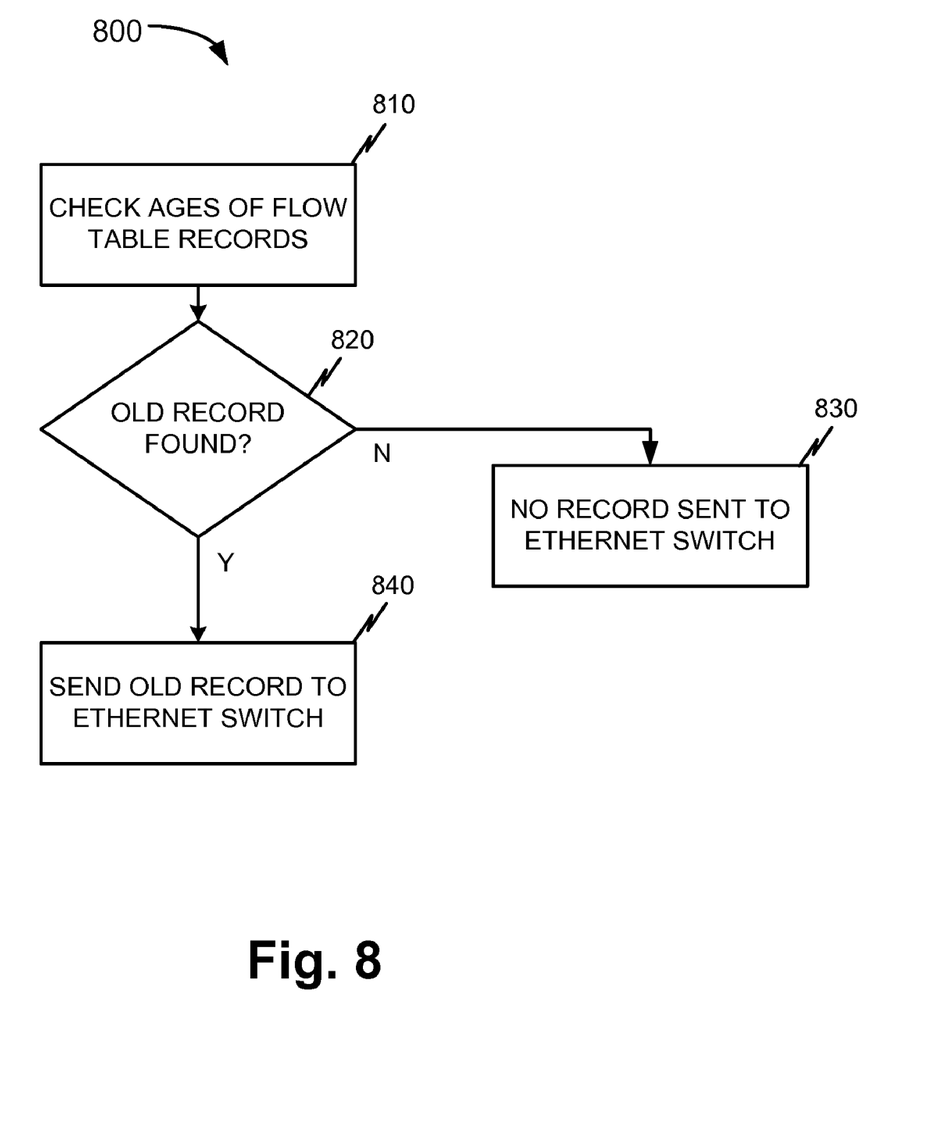
FIG. 8 is a flowchart of an exemplary process for updating a flow table.

FIG. 8 shows an exemplary flow table updating process 800. Process 800 may begin by checking the ages of flow table records (block 810). For example, a flow table record (as shown in FIGS. 5A and/or 5B) may also contain or include a time stamp value that may indicate when the record was last updated. FFQ 320 may then check the age of each record in flow table 430 to determine if an old record is found (block 820). For example, if a flow table record has not been updated within an hour, it may be considered as "old." If, for example, no old flow table records have been found (No in block 820) no flow table records may be sent to Ethernet switch 350. If, for example, old flow table records have been found (Yes in block 820) the identified old flow table records may be sent to Ethernet switch 350 (block 840). Additionally, when LCPU/VCPU 360 stores a shadow flow table, FFQ 320 may send a message and/or notify LCPU/VCPU 360 that a flow record has been removed/deleted so LCPU/VCPU 360 may also update the shadow flow table.

As described above, the embodiments allow flows of data packets to be identified, monitored and stored in a table of records. Additionally, the records may be used to indicate if flows of data packets may be sampled. The flow records and sampled data packets may be transmitted to an external device for further analysis via an out-of-band port. The foregoing description of implementations provides an illustration, but is not intended to be exhaustive or to limit the implementations to the precise form disclosed. Modifications and variations are possible in light of the above teachings or may be acquired from practice of the teachings.

For example, while series of blocks have been described with regard to the processes illustrated in FIGS. 6-8, the order of the blocks may be modified in other implementations. Further, non-dependent blocks may represent blocks that can be performed in parallel. For example, blocks 610-660 that are performed for one data packet may be independent of blocks 610-660 for a second data packet and, therefore, may be performed in parallel to blocks 610-660 for the second data packet. Further, it may be possible to omit blocks within a process. Additionally, processes of FIGS. 6-8 may be performed in parallel.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
a plurality of interfaces connected via an interconnect, where each of the plurality of interfaces includes:
a memory,
a packet processing unit to:
receive a first packet and a second packet, and
forward, through a sampling unit, the first packet and the second packet for transmission toward respective destinations; and
the sampling unit to:
determine a first flow identifier (ID) and a second flow ID, where the first flow ID and the second flow ID identify, respectively, a first flow associated with the first packet and a second flow associated with the second packet,
determine that the first flow ID does not match any of a plurality of existing flow IDs stored in the memory, and that the second flow ID matches one of the plurality of existing flow IDs stored in the memory,
determine that a particular one of the plurality of existing flow IDs in the memory is old, where the particular one of the plurality of existing flow IDs in the memory is old when a sent packet, related to the particular one of the plurality of existing flow IDs in the memory, has not been received from the packet processing unit within a particular period of time,
access, in response to determining that the second flow ID matches one of the plurality of existing flow IDs stored in the memory, additional data included in the memory and associated with the second flow ID,
sample, in response to determining that the first flow ID does not match any of the plurality of existing flow IDs stored in the memory, the first packet,
sample, based on accessing the additional data included in the memory and associated with the second flow ID, the second, and transmit, within the network device, the first flow ID, the second flow ID, the sampled first packet, and the sampled second packet to another of the plurality of interfaces.

2. The network device of claim 1, where the sampling unit, in response to determining that the first flow ID does not match one of the plurality of existing flow IDs in the memory, is further to:
transmit the first flow ID to one or more of the plurality of interfaces; and
update the memory to include the first flow ID.

3. The network device of claim 1, where the sampling unit is further to:
transmit the particular one of the plurality of existing flow IDs to one or more of the plurality of interfaces; and
remove, from the memory, the particular one of the plurality of existing flow IDs.

4. The network device of claim 1, where the sampling unit is further to:
count and store a number of received packets or bytes associated with the first flow ID and with the second flow ID.

5. The network device of claim 2, where the sampling unit is further to:
determine that the memory is full;
transmit a message to one or more of the plurality of interfaces, where the message indicates that the memory is full; and
bypass updating the memory to include the first flow ID.

6. The network device of claim 1, where each of the plurality of interfaces further includes:
a processor to control transmission of the first flow ID, the second flow ID, the sampled first packet, and the sampled second packet to the other of the plurality of interfaces.

7. The network device of claim 1, where the memory includes, for one of the plurality of existing flow IDs:
a source address field to store a source address of a received flow associated with the one of the plurality of existing flow IDs,
a destination address field to store a destination address of the received flow,
a packet or byte count field to store a numerical value of received packets or bytes of the received flow, and
a sample field to store information indicating whether to sample another packet associated with the received flow.

8. The network device of claim 1, where each of the plurality of interfaces comprises a line card.

9. The network device of claim 1, where the sampling unit is further to:
sample, without accessing the memory, additional packets associated with the first flow until a first N packets received from the flow are sampled, where N is a particular number, and
transmit, within the network device, the sampled additional packets to the other of the plurality of interfaces.

10. A method comprising:
receiving, at an interface in a network device, a first packet and a second packet;
processing, by a packet processing unit in the interface, the first packet and the second packet to determine respective destinations;
creating, by the interface in the network device, a first flow identifier (ID) and a second flow ID, where the first flow ID identifies a first flow associated with the first packet and the second flow ID identifies a second flow associated with the second packet;
updating, by the interface in the network device, a memory of existing flow IDs based on the first flow ID and the second flow ID;
determining, by the interface in the network device and based on the memory of existing flow IDs, whether to sample the first packet and the second packet, where determining whether to sample the first packet and the second packet includes:
determining that the first flow ID does not match any of the plurality of existing flow IDs stored in the memory, and that the second flow ID matches one of the plurality of existing flow IDs stored in the memory,
accessing, in response to determining that the second flow ID matches one of the plurality of existing flow IDs stored in the memory, additional data included in the memory,
designating, in response to determining that the first flow ID does not match any of the plurality of existing flow IDs stored in the memory and regardless of the additional data, the first packet to be sampled, and
designating, based on accessing the additional data, the second packet to be sampled,
sampling, by the interface in the network device, the designated first packet and the designated second packet;
sending, by a switch associated with the network device, the sampled packets to another interface in the network device;
determining that one of the existing flow IDs stored in the memory is old when another packet, associated with the one of the existing flow IDs, is not received within a particular period of time; and
transmitting the determined one of the existing flow IDs to at least one other interface via the switch.

11. The method of claim 10, further comprising:
transmitting the first flow ID and the second flow ID to the other interface via the switch.

12. The method of claim 10, further comprising:
transmitting the first flow ID to the other interface via the switch in response to determining that the first flow ID does not match one of the existing flow IDs stored in the memory.

13. The method of claim 10, where accessing the additional data includes:
determining that the additional data indicates that packets associated with the second flow ID should be randomly sampled; and
selecting, based on the additional data, the second packet to be randomly sampled.

14. The method of claim 10, further comprising:
storing, in the memory of existing flow IDs, a number of packets or bytes associated with the second flow ID; and
updating the number of packets or bytes associated with the second flow ID based on the second packet.

15. The method of claim 10, further comprising:
determining that the memory of existing flow IDs is full; and
transmitting, via the switch, a message to indicate that the memory of existing flow IDs is full.

16. The method of claim 10, where the memory of existing flow IDs includes, for one of the existing flow IDs:
a source address field to store a source address associated with the one of the existing flow IDs;
a destination address field to store a destination address associated with the one of the existing flow IDs;

a packet or byte count field to store a numerical value of received packets or bytes associated with the one of the existing flow IDs; and a sample field to store information indicating whether to sample a received flow associated with the one of the existing flow IDs.

17. The method of claim 10, further comprising:

designating, in response to determining that the first flow ID does not match any of the plurality of existing flow IDs stored in the memory and regardless of the additional data, additional packets associated with the first flow to be sampled, where a first particular number of packets received from the first flow are designated to be sampled.

18. A non-transitory computer readable medium to store instructions that are executable on a processor of a network device, the instructions comprising:

one or more instructions to receive, at an interface in the network device, a first packet and a second packet;

one or more instructions to process, by a packet processing unit in the interface, the first packet and the second packet to determine respective destinations;

one or more instructions to create, by the interface in the network device, a first flow identifier (ID) and a second flow ID, where the first flow ID identifies a first flow associated with the first packet and the second flow ID identifies a second flow associated with the second packet;

one or more instructions to update, by the interface in the network device, a memory of existing flow IDs based on the first flow ID and the second flow ID;

one or more instructions to determine, by the interface in the network device and based on the memory of existing flow IDs, whether to sample the first packet and the second packet, where the one or more instructions to determine whether to sample the first packet and the second packet include:

one or more instructions to determine that the first flow ID does not match any of the plurality of existing flow IDs stored in the memory, and that the second flow ID matches one of the plurality of existing flow IDs stored in the memory, one or more instructions to access, in response to determining that the second flow ID matches one of the plurality of existing flow IDs stored in the memory, additional data included in the memory, one or more instructions to designate, in response to determining that the first flow ID does not match any of the plurality of existing flow IDs stored in the memory and regardless of the additional data, the first packet to be sampled, and one or more instructions to designate, based on accessing the additional data included in the memory, the second packet to be sampled, one or more instructions to sample, by the interface in the network device, the designated first packet and the designated second packet;

one or more instructions to send, by a switch associated with the network device, the sampled packets to another interface in the network device;

one or more instructions to determine that one of the existing flow IDs stored in the memory is old when another packet, associated with the one of the existing flow IDs, is not received within a particular period of time; and one or more instructions to transmit the determined one of the existing flow IDs to at least one other interface via the switch.

19. The non-transitory computer readable medium of claim 18, where the instructions further comprise:

one or more instructions to transmit the first flow ID and the second flow ID to the other interface via the switch.

20. The non-transitory computer readable medium of claim 18, where the instructions further comprise:

one or more instructions to transmit the first flow ID to the other interface via the switch in response to determining that the first flow ID does not match one of the existing flow IDs stored in the memory.

21. The non-transitory computer readable medium of claim 18, where one or more instructions to access the additional data include:

one or more instructions to determine that the additional data indicates that packets associated with the second flow ID should be randomly sampled; and one or more instructions to select, based on the additional data, the second packet to be randomly sampled.

22. The non-transitory computer readable medium of claim 18, where the instructions further comprise:

one or more instructions to store, in the memory of existing flow IDs, a number of packets or bytes associated with the second flow ID; and one or more instructions to update the number of packets or bytes associated with the second flow ID based on the second packet.

23. The non-transitory computer readable medium of claim 18, where the instructions further comprise:

one or more instructions to determine that the memory of existing flow IDs is full; and one or more instructions to transmit, via the switch, a message that includes an indication that the memory of existing flow IDs is full.

24. The non-transitory computer readable medium of claim 18, where the instructions further comprise:

one or more instructions to designate, in response to determining that the first flow ID does not match any of the plurality of existing flow IDs stored in the memory and regardless of the additional data, additional packets associated with the first flow to be sampled, where a first particular number of packets received from the first flow are designated to be sampled.

* * * * *